(12) United States Patent
Kruckenberg et al.

(10) Patent No.: US 8,627,675 B2
(45) Date of Patent: Jan. 14, 2014

(54) LEVER DESIGN VERSION OF "PUSH BUTTON" FILTER

(75) Inventors: Christopher A. Kruckenberg, Newburgh, IN (US); Jeffrey A. Spindler, Haubstadt, IN (US)

(73) Assignee: Whhirlpool Corporation, Benton Harbor, MI (US)

( * ) Notice: Subject to any disclaimer, the term of this patent is extended or adjusted under 35 U.S.C. 154(b) by 1019 days.

(21) Appl. No.: 12/697,674

(22) Filed: Feb. 1, 2010

(65) Prior Publication Data
US 2011/0185762 A1    Aug. 4, 2011

(51) Int. Cl.
*F25D 3/02*    (2006.01)
(52) U.S. Cl.
USPC .............................................. 62/318; 62/389
(58) Field of Classification Search
USPC ............ 62/318, 389, 449; 210/172.1; 29/700
See application file for complete search history.

(56) References Cited

U.S. PATENT DOCUMENTS

| 4,255,937 | A | * | 3/1981 | Ehrlich ........................... 62/264 |
| 4,942,630 | A | * | 7/1990 | Kantor et al. .................. 4/541.2 |
| 5,135,645 | A | * | 8/1992 | Sklenak et al. ................. 210/97 |
| 7,000,894 | B2 | | 2/2006 | Olson et al. |
| 7,056,435 | B2 | | 6/2006 | Jenkins et al. |
| 7,083,725 | B2 | | 8/2006 | Jenkins, Jr. et al. |
| 7,147,773 | B2 | | 12/2006 | Mitchell et al. |
| 7,442,301 | B2 | | 10/2008 | Huda |
| 2007/0227959 | A1 | | 10/2007 | Sinur et al. |
| 2008/0011008 | A1 | | 1/2008 | Cur et al. |

FOREIGN PATENT DOCUMENTS

| JP | 11138151 A | 5/1999 |
| WO | 2006/124906 A1 | 11/2006 |
| WO | 2008/027083 A2 | 3/2008 |
| WO | 2008/062948 A1 | 5/2008 |

* cited by examiner

*Primary Examiner* — Melvin Jones

(57) ABSTRACT

Described in this application is an improved cartridge, such as a water filter, and housing for the filter. The filter is preferably of the push-in type and the filter housing includes an assembly to automatically set the water filter in position as a cover over the filter is closed. According to one embodiment, the assembly consists of a cover and lever linkage which engage complimentary protrusions on the water filter.

30 Claims, 8 Drawing Sheets

20 Degrees

25 Degrees

45 Degrees

90 Degrees

LEVER DESIGN VERSION OF "PUSH BUTTON" FILTER

BACKGROUND OF THE INVENTION

Modern household appliances are packaged with a host of additions and options, bowing to consumer demand. For example, a common addition to a refrigerator is a water dispenser. Indeed, most newly-constructed homes feature a plumbed water line extending into the cavity where a refrigerator is to be placed. The convenience of chilled on-demand water available at a refrigerator dispenser is important to consumers.

In addition to chilled water in refrigerators, there has more recently developed a demand for filtered water available through the refrigerator water dispenser. Water from the plumbed water line may be passed through a water filter before being dispensed at the water dispenser. This filtering process removes contaminants from the water and results in a better flavor. However, water filters have a limited lifespan, and therefore need to be replaced periodically.

A number of various removable water filters have been developed. One type of removable water filter is the in-line water filter. Another type of removable water filter is the turn-in water filter which must be turned as it is inserted into the filter cavity to engage the input and output ports. A third type of removable water filter is the push-in water filter, such as that described in U.S. Pat. No. 7,147,773.

It is common to use the twist-in water filter for refrigerators, as they are easy to remove and provide leak resistance. However, these twist-in water filters often require a significant amount of force to twist and remove, making the replacement of water filters an uncomfortable and undesirable task as users are often concerned about applying sufficient force to remove the water filter for fear of damaging it.

Each of these existing water filters also has the problem of requiring additional space to insert or remove the water filter. For example, in U.S. Pat. No. 7,056,435 directed towards a hinge-down water filter, the filter must be mounted on the ceiling of the refrigerated compartment in order to allow space for the filter to hinge downwardly and the cover to open.

These water filters also often require the steps of opening the water filter cover, removing and replacing the water filter, and then closing the cover. Various covers may require either push-buttons, hinged clasps, screws, or other fasteners.

Other appliances may also require the use of removable cartridges for filtering, replacing liquids, or storage of additives. Removable cartridges for these appliances are often likewise difficult or time consuming to remove and replace, and therefore consumers would be well served with an easy to replace, removable, disposable, and inexpensive cartridge.

It is also known that removable cartridges for various appliances can serve valuable needs. For example, a soap dispensing cartridge may be incorporated into a dish or clothes washer to provide a predetermined amount of soap to a wash cycle. Alternately, a filter may be provided in a dishwasher to provide a rinse cycle of filtered water to prevent water spots on dishes and glassware. A number of other uses for a removable cartridge will be known to those having skill in the art. Therefore, it is preferable to have an improved removable cartridge for such appliances.

When an appliance company manufactures several types of appliances, it is also important to have a uniform cartridge for purposes of economy of manufacturing. It is less expensive and complex for a single cartridge design to serve in multiple situations than designing unique cartridges for every appliance. Therefore, it is further preferable to have an individual cartridge which may be used in a variety of environments without significant alteration of the cartridge.

There is therefore a need in the art for an easily removable refrigerator water filter which may be quickly removed and replaced.

There is further a need in the art for a water filter which requires a minimal amount of space within the refrigerated cabinet to remove and replace the water filter.

There is further a need in the art for a water filter cover assembly which aids in the removal and replacement of the cover to avoid additional steps.

There is further a need in the art for a universal replaceable cartridge design which may be adapted for use in many appliances.

There is further a need in the art for a single cartridge design which may be adapted or sized for a variety of purposes.

There is further a need in the art for a proprietary and unique cartridge design which can service multiple consumer needs.

These problems and others which are readily apparent from the following description are sought to be overcome in the present invention.

BRIEF SUMMARY OF THE INVENTION

What is described is an appliance generally having a compartment and a door covering the compartment. Within the compartment is a cartridge housing which is generally cylindrical in shape and has an open end for receiving a cartridge. The compartment is accessible from within the appliance compartment. Covering the opening is a hinged cover which may be selectively opened to expose the end of the cartridge. Attached to the cover is a hinged lever, the lever for engaging and drawing the cartridge out of the housing for replacement or removal.

DETAILED DESCRIPTION OF THE PREFERRED EMBODIMENT

The invention will now be described in detail according to the preferred embodiment with reference to the attached figures where numerals relate to their like in the following description.

Figure 1A:
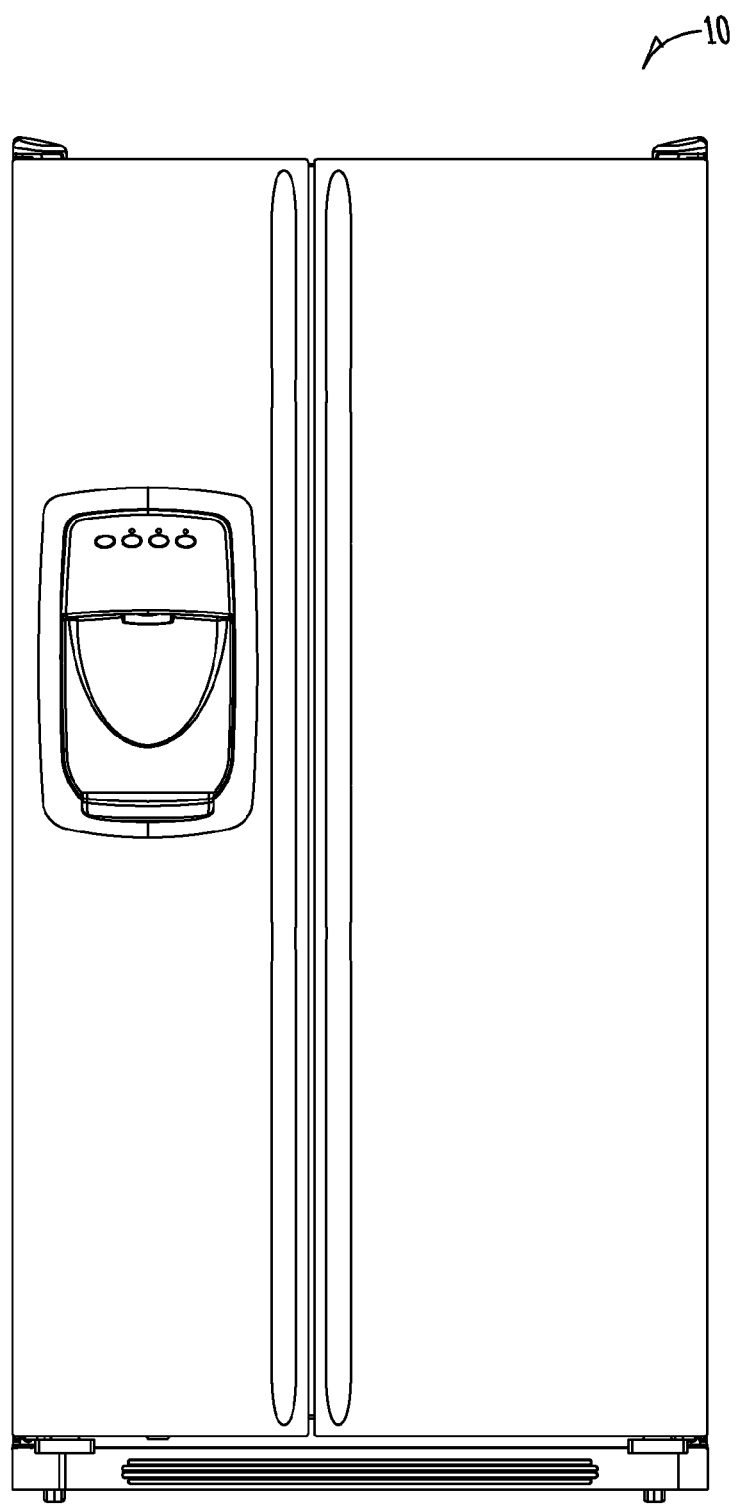
FIG. 1A shows a front view of a refrigerator.
Figure 1B:
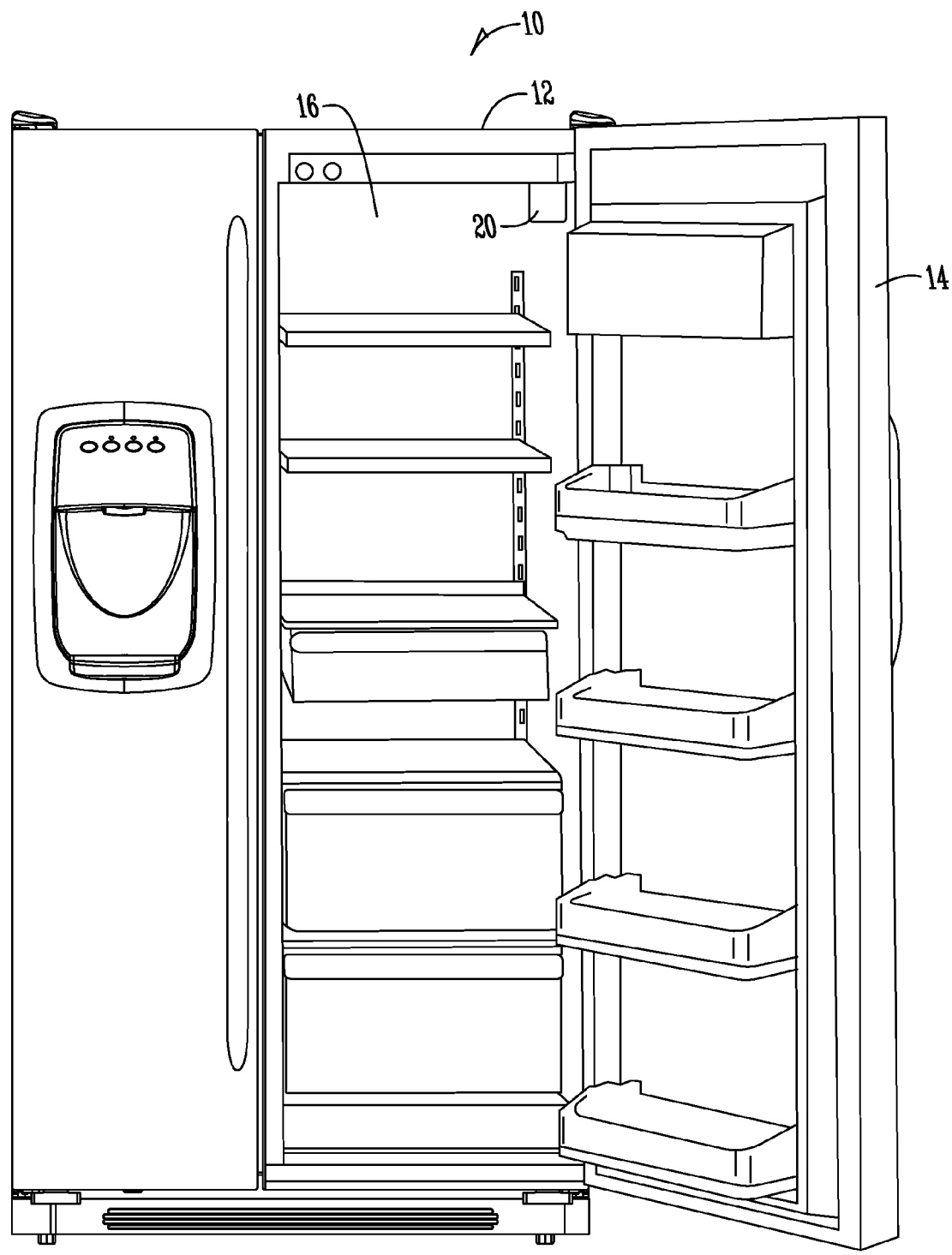
FIG. 1B shows a front view of a refrigerator with one of the doors opened to reveal the interior.

The lever design version of the push button removable cartridge is described generally as a filter located within a refrigerator 10 consisting of an enclosure 12 and door 14, as shown in FIGS. 1A and 1B. It will be appreciated to those skilled in the art that such an arrangement is a preferred embodiment, and that the removable cartridge may be adapted for use in a variety of appliances for a variety of purposes. These purposes include, but are not limited, to, a soap cartridge for a washing machine, a filter for a dishwasher, and a flavor container for a water dispenser.

As shown in FIG. 1B, the enclosure 12 surrounds a refrigerated cabinet 16 within which resides a water filter assembly 20. A water filter housing 22 is seated adjacent to one of the walls of the refrigerated cabinet 16 so that it is positioned out of the way, allowing maximum use of space in the refrigerated cabinet 16. The water filter assembly 20 is preferably accessible from within the refrigerated cabinet 16. It is further contemplated that the water filter assembly may be accessible from outside of the refrigerated cabinet 16, or that the water filter assembly 20 may be located completely outside of the refrigerated cabinet.

Figure 2A:
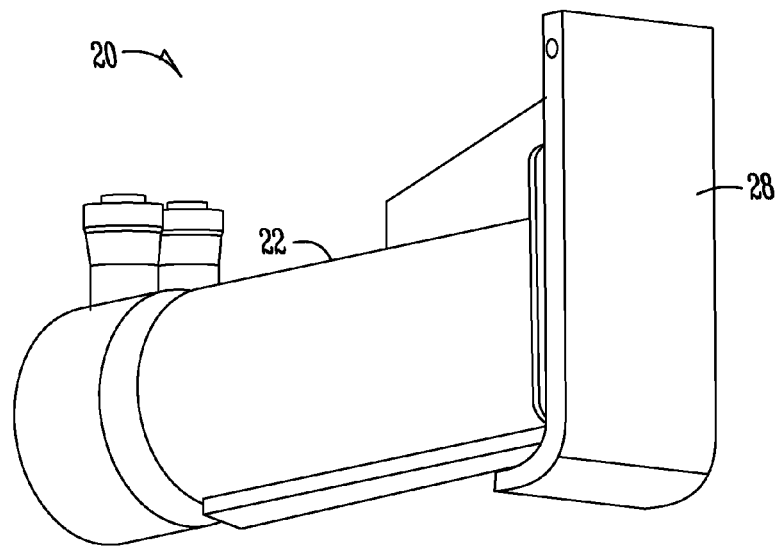
FIG. 2A shows a perspective view of the water filter assembly with the cover in a closed position.
Figure 2B:
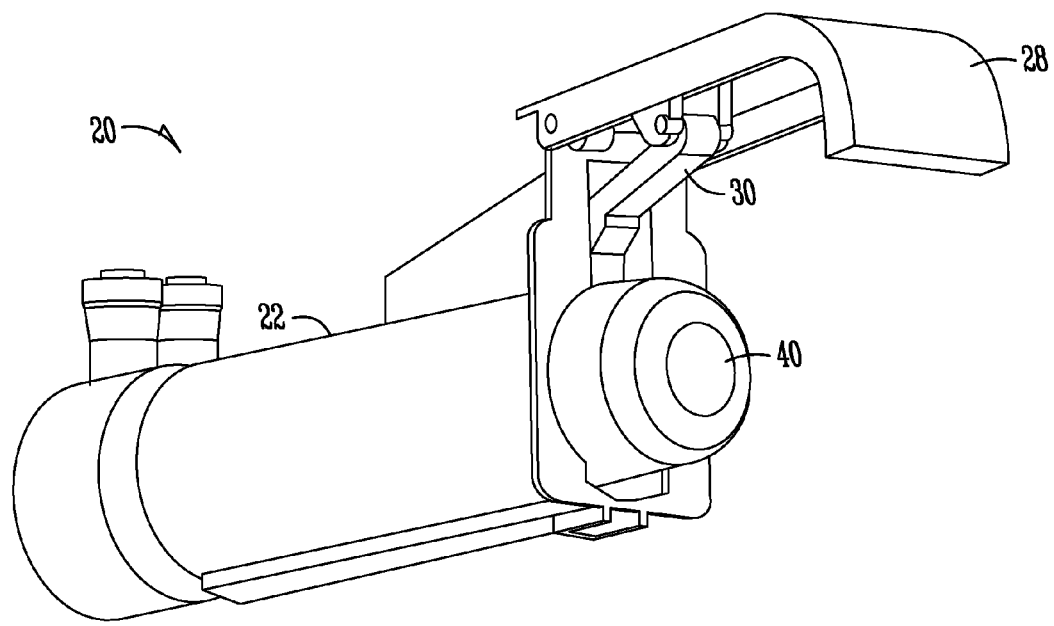
FIG. 2B shows a perspective view of the water filter assembly with the cover in an open position.

As shown in FIGS. 2A and 2B, the water filter assembly 20 generally comprises a water filter housing 22 and a water filter 40. The water filter housing 22 encloses a filter cavity 26 (see FIG. 3A) which holds the filter 40 and is operatively connected to the water system of the refrigerator 10. The water filter housing 22 also features an opening 24 (see FIGS. 3A and 3B) allowing access to the filter cavity 26. The opening 24 is preferably sized to accommodate a water filter 40 being inserted lengthwise into the filter cavity 26 of the water filter housing 22.

As described, the housing may be used with replaceable containers of various purposes. The drawings show generally a refrigerator water filter with a water inlet and an outlet. However, it should be appreciated that the use of the container may vary without departing from the operation of the container. For example, the container may include only an outlet so that a fluid is dispensed from the container without water or other fluid carrier. Alternatively, the container may include a water inlet and a liquid outlet, whereby water flowing into the inlet displaces the liquid within the container, causing the liquid to be dispensed through the outlet.

Figure 3A:
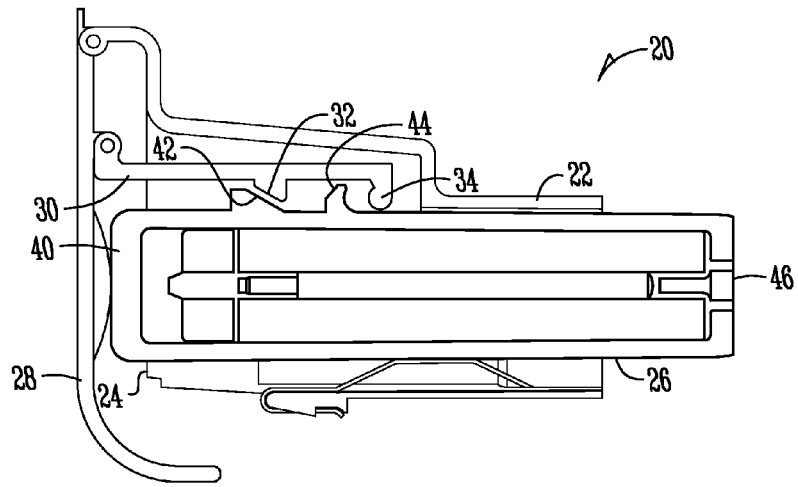
FIG. 3A shows a cutaway view of the water filter assembly with the cover in a closed position.
Figure 3B:
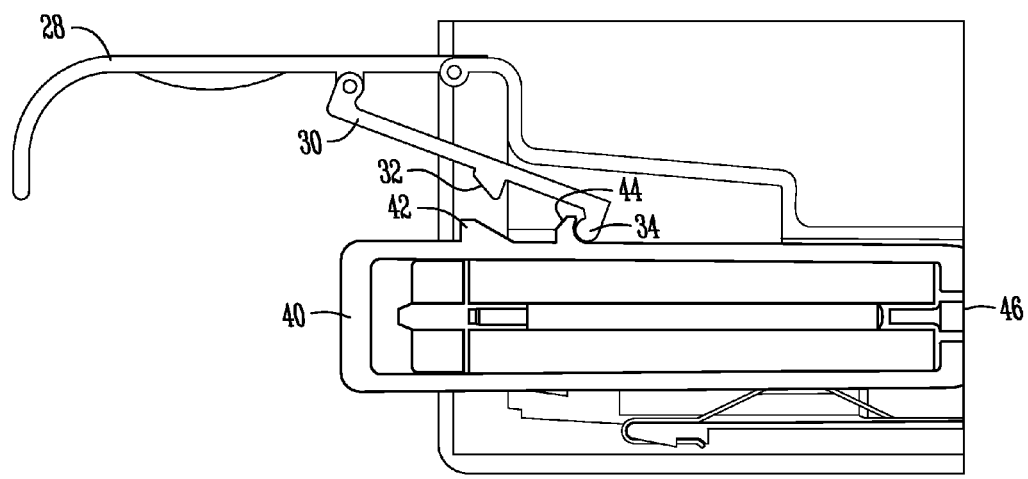
FIG. 3B shows a cutaway view of the water filter assembly with the cover in an open position.

Covering the opening 24 is a cover 28 allowing selective access to the filter cavity 26. The cover 28 is preferably hinged to the water filter housing 22, allowing the cover 28 to be rotated so as to expose the opening 24. The cover is generally shown in FIGS. 3A and 3B as being hinged to the top of the filter housing 22, although this is not required. Alternative embodiments with the cover 28 hinged to either of the sides or bottom of the filter housing 22 are contemplated. Additionally, while cover 28 is shown without having a clasp or other securing mechanism, it is contemplated that this type of improvement may be added to prevent accidental disengagement of the filter 40.

As shown in FIGS. 3A and 3B, pivotally connected to the cover 28 is a lever 30 which extends into the filer cavity 26. Preferably located on the lever 30 are a wedge 32 and a tooth 34. The wedge 32 engages a complimentary wedge 42 on the water filter 40 while the tooth 34 engages a similar protrusion 44 on the water filter 40. Other structure may be used for these various components so long as they achieve the results as detailed below.

FIGS. 5A-F show the water filter cover 28 being opened from 0 degrees to 90 degrees as the filter 40 is drawn from the filter cavity 26.

Figure 5A:
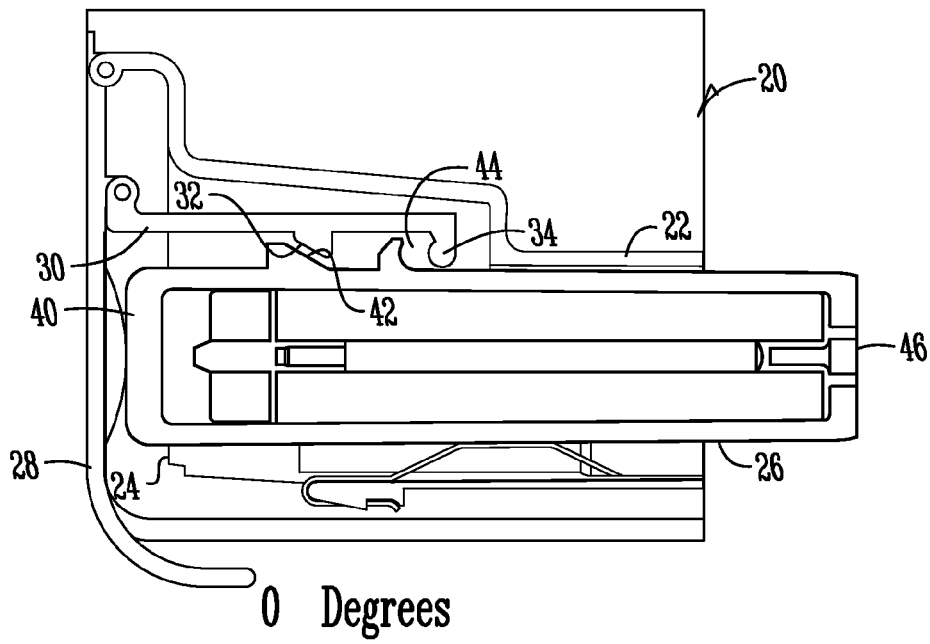
FIG. 5A shows a cutaway view of the water filter assembly with the cover in a 0 degree closed position.
Figure 5B:
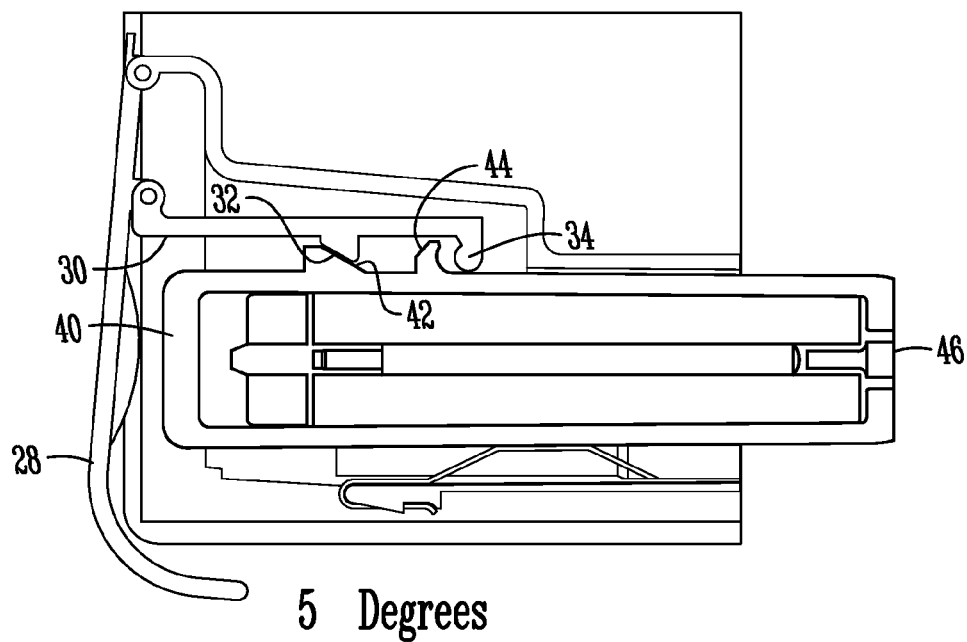
FIG. 5B shows a cutaway view of the water filter assembly with the cover open to 5 degrees.

When the water filter 40 is being removed from the cavity 26, the filter cover 28 is first opened to approximately five degrees (FIG. 5B). In this position, the sloped edge of the wedge 32 on the lever 30 has contacted the wedge 42 on the water filter 40. The water filter 40 is prevented from exiting the cavity 26 by the lock 31. The tooth 34 on the rearward end of the lever 30 is not in contact with the protrusion 44 on the water filter 40.

Figure 5C:
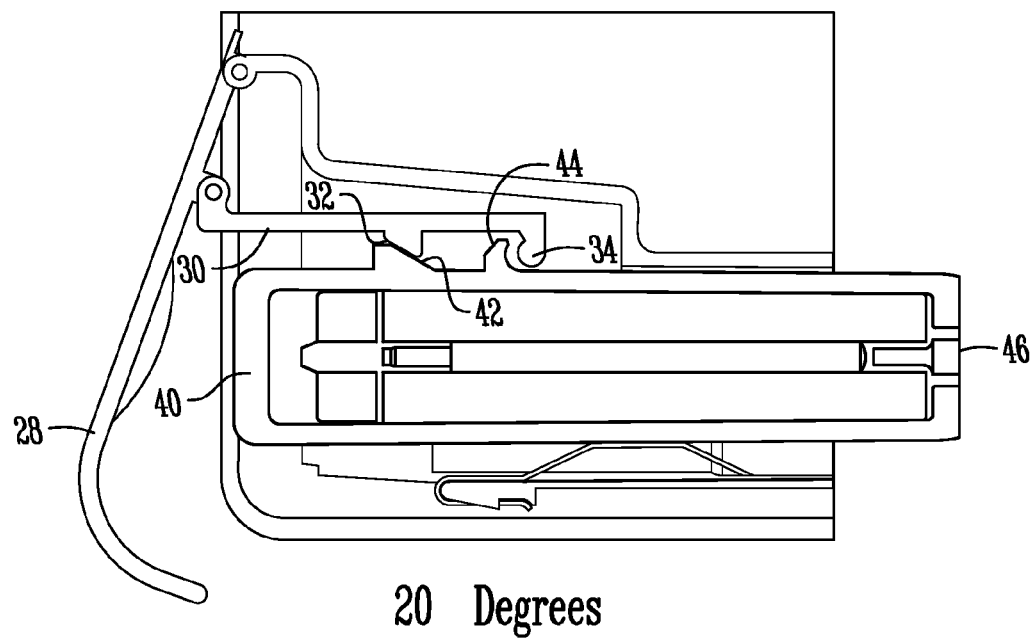
FIG. 5C shows a cutaway view of the water filter assembly with the cover open to 20 degrees.

The filter cover 28 is next opened to approximately twenty degrees (FIG. 5C). In this figure, the wedge 32 of the lever 30 has applied a downward force on the wedge 42 on the water filter 40, causing the filter 40 to shift downward. The flat forward edge of the surface 42 of the water filter is still in contact with the lock 31. Additionally, the rearward lever tooth 34 has not yet contacted the filter protrusion 44.

Figure 5D:
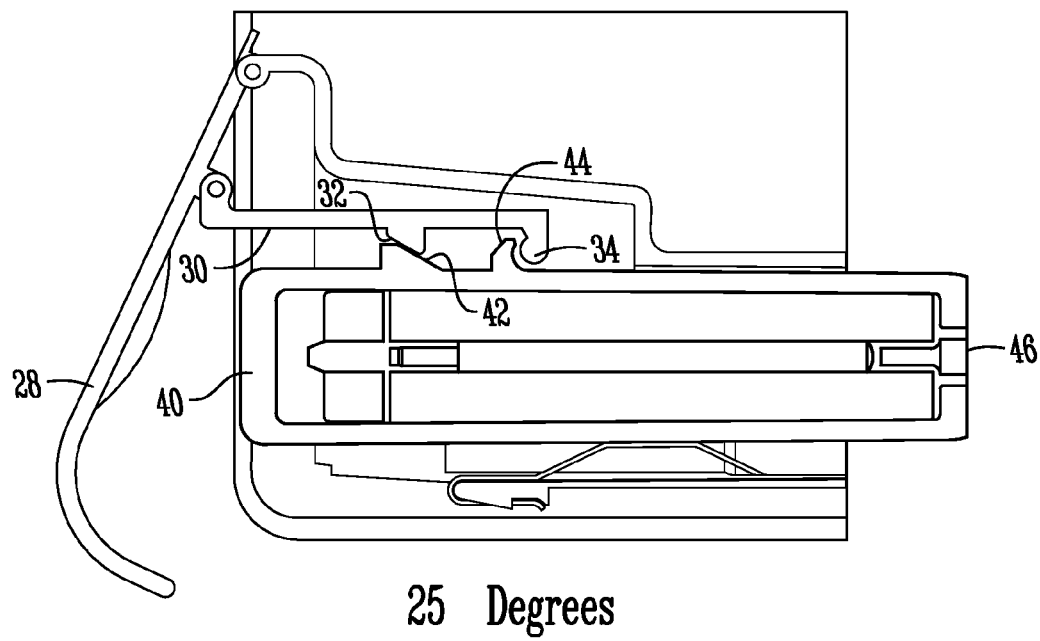
FIG. 5D shows a cutaway view of the water filter assembly with the cover open to 25 degrees.

The filter cover 28 is next opened to approximately twenty-five degrees (FIG. 5D). Here the filter 40 has been depressed by the interaction between the sloped protrusion 34 of the lever 30 and the sloped surface 44 of the water filter 40. The flat surface of the surface 44 has been depressed sufficiently so that the lock 31 no longer obstructs lateral movement of the filter 40.

Figure 5E:
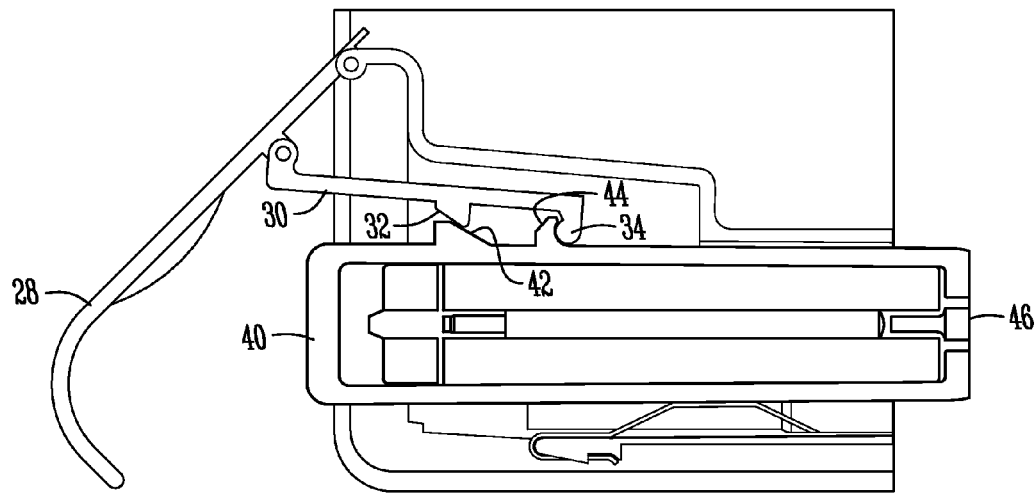
FIG. 5E shows a cutaway view of the water filter assembly with the cover open to 45 degrees.

As the filter cover 28 is opened to approximately 45 degrees, as shown in FIG. 5E, the rear tooth 34 of the lever 30 comes into contact with the protrusion 44 on the water filter 40. The rear tooth 34 acts to draw the water filter 40 out of the cavity 26 as the filter cover 28 is further opened. Lock 31 is no longer in contact with the filter 40, allowing the filter 40 to be easily removed.

Figure 5F:
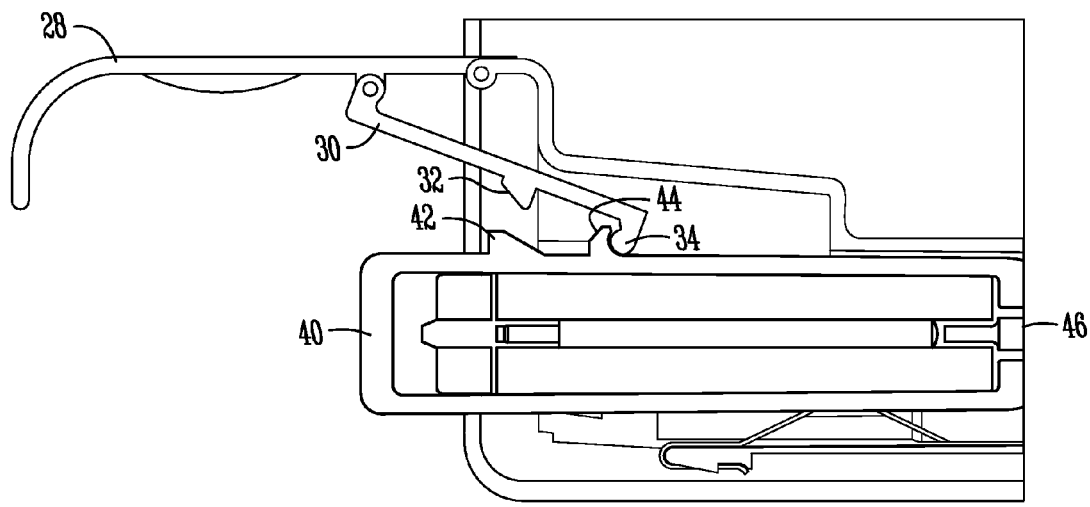
FIG. 5F shows a cutaway view of the water filter assembly with the cover fully open.

Finally, once the filter cover 28 has been opened to 90 degrees, as shown in FIG. 5F, the water filter 40 has been completely drawn out of the cavity 26 by the rear tooth 34. A user may then grasp the water filter 40 and completely withdraw it from the filter cavity 26 for removal and replacement.

When installing a new water filter 40 into the filter cavity 26, the process is reversed. A new water filter 40 is placed in the filter cavity 26. The filter 40 is pushed into the cavity 26, where the rear protrusion 44 on the filter 40 contacts the tooth 34. The action of inserting the filter 40 causes the lever 30 to draw the cover 28 closed. As the sloped rear face of the surface 42 of the filter 40 contacts the lock 31, the filter 40 is depressed downward against biasing spring 33.

There is a gap between the rear of the filter cover 28 and the water filter 40 when the filter cover 28 is closed. This gap ensures that the filter cover 28 completely closes over the filter cavity 26 without catching or damaging the water filter 40. The filter cover 28 therefore further includes a curved raised surface 29 which, when the filter cover 28 is completely closed or locked into place, further pushes the water filter 40 into the filter cavity 26. This raised surface 29 seats the water filter 40 completely within the filter cavity 26. The raised surface 29 further engages the water filter 40 with the push-in component 46 of the filter interface in the refrigerator.

It is not until the water filter 40 is completely set in the filter cavity 26 that the surface 42 is secured by the lock 31. A biasing spring 33 ensures that the water filter 40 is locked into place by the lock 31 as the surface 42 passes this point and engages the lock 31. The spring ensures that the water filter 40 is aligned vertical direction while the lock 31 ensures that the water filter 40 is aligned in the horizontal direction. These two components fix the water filter 40 in a preferred location for the push-in interface 46, ensuring proper flow of water through the filter.

Figure 4:
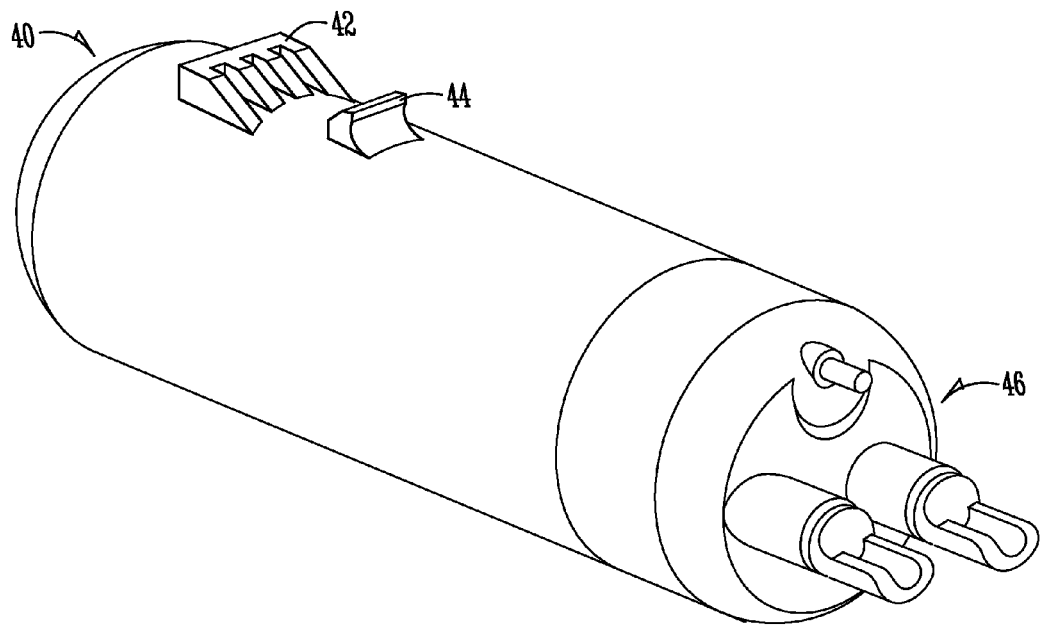
FIG. 4 shows a rear perspective view of the water filter.

The invention also contemplates a novel water filter 40 which is to be used in conjunction with the novel water filter assembly 20 mounting structure. As shown in FIG. 4, the water filter is of the push-in type as described in U.S. Pat. Nos. 7,147,773 and 7,000,894. This push-in type filter is engaged when the water filter is fully inserted into the filter cavity 26, thereby eliminating a separate step of engaging the water filter into the housing 22. The water filter 40 is preferably of a long cylindrical shape, although other shapes are contemplated. For example, the water filter 40 may be keyed so that it cannot be inserted at an improper orientation into the filter cavity 26.

The water filter 40 preferably contains first 42 and second 44 protrusions. The first protrusion 42, is saw-tooth shaped with a shear front edge and a sloping back edge. This sloped back edge allows the water filter to be depressed by a complimentary shaped surface while the shear front edge locks the filter into position in the filter cavity 26.

The second protrusion 44 is shown as having a flat front edge with a curved rearward edge. This is one variation, although it is not required. The second protrusion 44 should be shaped in a manner that allows it to be drawn out from the filter cavity 26. Therefore, the rearward edge of the second protrusion 44 may be flat, curved, or any other shape which can be engaged by a complimentary surface by a lever 30. The front surface of the second protrusion 44 may be sloped as shown. This sloping allows the filter to avoid a lock 31 as demonstrated in FIGS. 5A-F. However, the filter cavity 26, location of the biasing spring 33, design of the lever 30, positions of the protrusions 42, 44 on the water filter 40, and other factors may be adjusted so that this design is not required. For example, the first protrusion 44 and second protrusion 42 may be offset 90 degrees about the circumference of the water filter 40, thereby negating the need for the second protrusion 44 to have a sloped surface for avoiding the lock 31.

The invention has been described as relating to a refrigerator water filter, however it should be appreciated that other alternative arrangements may also be used. For example, instead of filtering water, the container and assembly may be used to dispense liquids. In one example, a liquid detergent may be placed in the container and the liquid detergent is dispensed into a clothes or dish washer. The container would be replaceable, each container having a predetermined amount of liquid to be dispensed, corresponding to a predetermined number of wash cycles. According to another embodiment, the container may include a solid, gel, or liquid additive. Instead of removing contaminants from water flowing through the container (as with a filter), flavor additives may be added to the water flow. Such a device would work with a juice or other flavored beverage dispenser, and be replaceable.

As has been described above, the assembly and container combination may be used separately or together in a number of appliances for a number of purposes. The assembly and container are therefore not limited to the specific use of a refrigerator, but may be used in a number of various embodiments.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. A refrigerator comprising:
    a refrigerated compartment;
    a door providing access to the refrigerated compartment;
    a water system;
    a water filter housing having an open end and in fluid communication with the water system;
    a water filter removably seated within the water filter housing;
    a hinged cover hingedly and selectively covering the open end of the water filter housing; and
    a lever pivotally connected to the hinged cover, the lever having at least one tooth;
    wherein the at least one tooth is adapted to draw the water filter from the housing as the hinged cover is opened.

2. A refrigerator comprising:
    a refrigerated compartment;
    a door providing access to the refrigerated compartment;
    a water system;
    a water filter housing having an open end and in fluid communication with the water system;
    a water filter removably seated within the water filter housing;
    a hinged cover adjacent the open end of the water filter housing;
    a lever pivotally connected to the hinged cover, the lever having at least one tooth, wherein the at least one tooth is adapted to draw the water filter from the housing as the hinged cover is opened; and
    a second tooth, the second tooth having a shear front edge and a sloped rear edge.

3. The refrigerator of claim 2 wherein the second tooth.

4. The refrigerator of claim 3 wherein the water filter comprises a first protrusion, the first protrusion corresponding to one of the first and second teeth.

5. The refrigerator of claim 4 wherein the water filter comprises a second protrusion, the second protrusion corresponding to the other of the first and second teeth.

6. The refrigerator of claim 5 wherein the first and second protrusions have an engagement edge and a sloped edge.

7. The refrigerator of claim 6 wherein the first and second teeth have an engagement edge and a sloped edge.

8. The refrigerator of claim 5 wherein the first and second protrusions are axially distant.

9. A refrigerator comprising:
    a refrigerated compartment;
    a door providing access to the refrigerated compartment;
    a water system;
    a water filter housing having an open end and in fluid communication with the water system;
    a water filter removably seated within the water filter housing;
    a hinged cover adjacent the open end of the water filter housing; and
    a lever pivotally connected to the hinged cover, the lever having at least one tooth,
    wherein the at least one tooth is adapted to draw the water filter from the housing as the hinged cover is opened, and
    wherein the water filter is a push-in type.

10. A water filter for use in a refrigerator having a filter receiver, the water filter comprising:
    a housing comprising a cylinder having a first end, a second end, and a circumference;
    a filter within the housing;

an input port and an output port on the first end of the housing; and a first protrusion positioned on the circumference of the housing, the first protrusion having a first sloped edge and a second edge, the second edge nearer the first end; and a second protrusion positioned axially nearer the second end on the circumference of the housing, the second protrusion having a first sloped edge and a second edge, the second edge nearer the second end;

wherein the input port and output port interface with the refrigerator when the filter is depressed axially to the filter receiver.

11. The water filter of claim 10 wherein the filter is a carbon filter.

12. The water filter of claim 10 wherein the second edge of the first protrusion comprises a concave edge.

13. The water filter of claim 10 wherein the second edge of the second protrusion comprises a square edge.

14. A method of replacing a water filter in a filter cavity of a refrigerator comprising the steps of:

opening a cover over the filter cavity, thereby drawing the filter from the filter cavity and disengaging the water filter from the refrigerator;

removing the water filter from the filter cavity;

placing a second water filter in the filter cavity;

closing the cover, thereby positioning the water filter within the filter cavity and engaging the water filter to the refrigerator.

15. The method of claim 14 wherein the filter cavity comprises a key slot.

16. The method of claim 15 wherein the water filter comprises a key corresponding to the key slot.

17. The method of claim 16 further comprising the step of aligning the water filter to the filter cavity.

18. The method of claim 14 wherein the cover comprises a cap pivotally connected to the refrigerator and a lever pivotally connected to the cap.

19. The method of claim 18 wherein the lever has first and second teeth.

20. The method of claim 19 wherein the water filter has first and second protrusions corresponding to the first and second teeth.

21. A cartridge for use in an appliance, the cartridge comprising:

a housing enclosing a space, the housing having a forward end and a rearward end and a perimeter;

a first protrusion positioned on the perimeter, the first protrusion having a forward surface for engaging a lock;

a second protrusion positioned on the perimeter, the second protrusion having a rearward surface for being engaged by a tooth;

wherein the cartridge may be drawn out of the appliance by means of a single action lever.

22. The cartridge of claim 21 wherein housing comprises a cylindrical shape.

23. The cartridge of claim 22 wherein the first and second protrusions are axially distant.

24. The cartridge of claim 23 further comprising at least one inlet or outlet.

25. The cartridge of claim 24 wherein the at least one inlet or outlet engages with a corresponding port on the appliance.

26. The cartridge of claim 25 wherein the cartridge is seated to the appliance by axially pushing the cartridge into the port on the appliance.

27. The cartridge of claim 26 wherein the first protrusion further comprises a rearward surface for engaging a lever on the appliance to depress the cartridge.

28. The cartridge of claim 27 wherein the housing encloses a filter.

29. The cartridge of claim 28 wherein the appliance is a refrigerator.

30. The cartridge of claim 29 wherein the cartridge includes both an inlet and an outlet, whereby water received from the inlet is filtered through the filter and passed to the outlet.

* * * * *